United States Patent [19]

Cavallo

[11] Patent Number: 5,381,475
[45] Date of Patent: Jan. 10, 1995

[54] ARRANGEMENT FOR SUPPRESSING ECHOES IN A DIGITAL PORTABLE TELEPHONE

[75] Inventor: Mark C. Cavallo, Eatontown, N.J.

[73] Assignee: AT&T Corp., Murray Hill, N.J.

[21] Appl. No.: 160,140

[22] Filed: Dec. 2, 1993

[51] Int. Cl.6 ........................................... H04M 9/08
[52] U.S. Cl. .................................. 379/410; 379/402; 379/406; 379/411; 379/407; 379/408; 379/409; 379/390; 379/58
[58] Field of Search ................... 379/410, 88, 58, 411, 379/412, 406, 402, 390, 407, 409; 455/203, 179, 63; 375/1; 370/32.1, 110.3

[56] References Cited

U.S. PATENT DOCUMENTS

| | | | |
|---|---|---|---|
| 4,864,608 | 9/1989 | Miyamoto et al. | 379/409 |
| 4,970,915 | 11/1990 | McMahan | 370/32.1 |
| 4,979,163 | 12/1990 | Erving et al. | 379/406 |
| 5,195,132 | 3/1993 | Bowker et al. | 379/406 |

Primary Examiner—James L. Dwyer
Assistant Examiner—Jacques M. Saint-Surin
Attorney, Agent, or Firm—Samuel R. Williamson

[57] ABSTRACT

An echo suppression arrangement for use in a digital portable telephone prevents sidetone echo appearing in the base unit of the telephone from being coupled to and emanating at the handset unit of the telephone. The echo suppression arrangement determines the direction of dominant speech signals appearing in the base unit while communicating with the handset unit. These dominant speech signals either originate at the handset unit or at a remote telephone station and are received by the base unit over a telephone line connected to the base unit. If the dominant signal in the base unit is from the handset unit, the echo suppressor arrangement inserts a predetermined amount of loss into a receive voice path which couples signals to the handset unit. This prevents the sidetone echo from being produced in the handset voice receiver when the user of the handset unit is speaking. If the dominant signal is from the remote telephone station, however, the echo suppression arrangement removes the predetermined amount of loss from the receive voice path. This allows for normal receiver voice response at the handset unit. Since users of the handset unit expect to receive some sidetone level, a desired level of normal sidetone is provided locally in this handset unit.

23 Claims, 3 Drawing Sheets

ARRANGEMENT FOR SUPPRESSING ECHOES IN A DIGITAL PORTABLE TELEPHONE

BACKGROUND OF THE INVENTION

1. Technical Field

This invention relates to portable telephones and, more particularly, to portable telephones employing packetized wireless transmissions.

2. Description of the Prior Art

Recent rulings promulgated by the Federal Communication Commission (FCC) for the use of spread spectrum systems, including a frequency hopping system, now allow for increased spectral utilization by portable telephones. Frequency hopping systems spread their energy by changing, or hopping, the center frequency of the transmission many times a second in accordance with a pseudo randomly generated list of communication channels. The result is a significantly higher signal to noise ratio than may be achieved by conventional techniques such as amplitude modulation that uses no bandwidth spreading.

Digital portable telephones are now being designed for use in spread spectrum systems, including frequency hopping systems. One such digital portable telephone is disclosed in U.S. patent application Ser. No. 07/779,754 filed in the name of M. E. Gillis et al. on Oct. 21, 1991. This digital portable telephone utilizes time division duplexing for communicating between a base unit and its associated handset unit. In the operation of such a portable telephone, the base unit and the handset unit communicate with each other by alternately transmitting and receiving a signal on the same channel. Thus, while the base unit is transmitting on a channel, the handset unit is configured for receiving the signal from the base unit over that same channel. Similarly, while the handset unit is transmitting on the channel, the base unit is configured for receiving the signal from the handset unit. Due to the packetizing handling of voice data in these digital portable telephones, delays which result in echoes discernible by the user of the handset unit may be generated at certain packetizing rates of the voice data.

Some propagation delay of the voice signal is normal and is present in all portable telephones. Presently available analog portable telephones, which employ analog technology in communicating between a base unit and a handset unit, delay the voice signal by propagation path delay and any analog circuit delays. These delays are at most several microseconds in length and are, therefore, not noticeable by a user of a handset unit in an analog portable telephone as his or her speech signal is returned to the handset unit and heard as sidetone. These delays are similarly associated with a digital portable telephone. With a digital portable telephone which also employs time division duplexing, however, there can be a significant delay between the time that the handset unit user speaks and the time that his or her speech signal is reflected back to the handset unit. This produces a noticeable and possibly annoying sidetone echo to the user of the handset unit while he or she is speaking.

SUMMARY OF THE INVENTION

The prior art problem is solved in accordance with the present invention by employing an echo suppression arrangement which attenuates the reflected voice signal from the handset unit appearing in the base unit, and thereby prevents the sidetone echo from being coupled to and emanating at the handset unit.

In accordance with the disclosed embodiment of the invention, the echo suppression arrangement determines the direction of dominant speech signals appearing in the base unit while this unit is communicating with the handset unit. These dominant speech signals either originate at the handset unit or at a remote telephone station and are received by the base unit over a telephone line connected to the base unit. If the dominant signal in the base unit is from the handset unit, the echo suppressor arrangement inserts a predetermined amount of loss into a receive voice path which couples signals to the handset unit. This prevents the sidetone echo effect from being produced in the handset voice receiver when the user of the handset unit is speaking. If the dominant signal is from the remote telephone station, however, the echo suppression arrangement removes the predetermined amount of loss from the receive voice path. This allows for normal receiver voice response at the handset unit. Since users of the handset unit expect to receive some sidetone level, a desired level of normal sidetone is provided locally in this handset unit.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
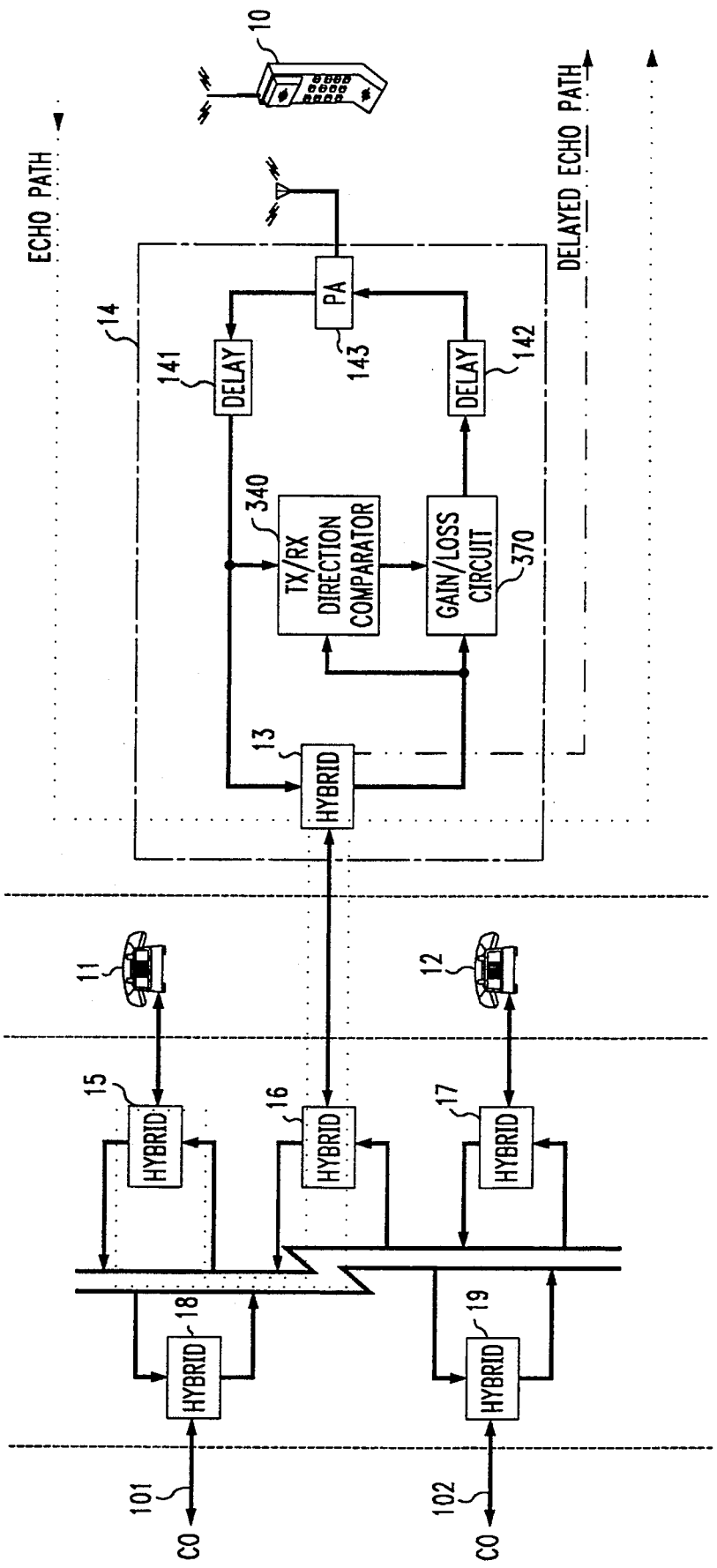
FIG. 1 is a general block diagram of a communication system and selected circuitry for suppressing echoes generated by a digital portable telephone that operates in such a system.

Referring now to FIG. 1 of the drawing, there is shown a general block diagram of a communication system and echo suppression circuitry for suppressing echoes generated by a digital portable telephone that may operate in such a system. As shown, the communication system comprises a private branch exchange (PBX) switch including a plurality of wired telephone stations 11 and 12 respectively connected through hybrids 15 and 17 to the PBX switch. The PBX switch also connects to a central office (CO) over lines 101 and 102 respectively through hybrids 18 and 19. Such a switch may illustratively be the DEFINITY ® PBX switch. This switch may also be a telecommunication switch such as the 5ESS ® central office switch. Both of these switches are operable with and useful for describing the operation of the present invention.

As illustrated generally in FIG. 1, the digital portable telephone comprises a handset unit 10 and a base unit 14. Like the wired telephone stations, the base unit 14 is wired to the PBX switch via an internal hybrid 13 which, in turn, connects to the PBX switch through a hybrid 16. The handset unit 10 and the base unit 14 communicate with each other via a frequency hopping system which operates over a plurality of communication channels.

A general overview of spread spectrum technology including frequency hopping systems is provided by R. C. Dixon, *Spread Spectrum Systems*, New York: John Wiley and Sons, 1984, by U.S. Pat. No. 4,479,226 issued to V. K. Prabhu et al. on Oct. 23, 1984, U.S. Pat. No. 4,850,036 issued to J. W. Smith on Jul. 18, 1989 and U.S. patent application Ser. No. 07/779,754 filed in the name of M. E. Gillis et al. on Oct. 21,1991, these patents and the application being incorporated herein by reference. The specific requirements for the frequency hopping system in which this portable telephone is designed to operate are set forth in a Report and Order in General Docket No. 89-354, this Report and Order being adopted by the Federal Communications Commission on Jun. 14, 1990 and released on Jul. 9, 1990.

The illustrated echo suppression circuitry of the digital portable telephone includes a transmit/receive direction comparator 340 and a gain/loss circuit 370 which combine in providing for the suppressing of echoes or undesirable sidetone generated in the portable telephone.

The voice feedback from the voice transmitter of a handset unit to the voice receiver of the handset unit is commonly referred to as sidetone. Some level of sidetone is highly desirable from a human factors perspective. In typical analog telephones, the delay in the feedback voice signal is due primarily to path delay and any analog circuit delay. This combined delay is at most several microseconds in length and is not perceivable by the user of the handset unit.

In the operation of a digital portable telephone which utilizes time division duplexing for communicating between a base unit and its associated handset unit, the base unit and the handset unit communicate with each other by alternately transmitting and receiving on the same channel. By way of example, while the base unit is transmitting on a channel, the handset unit is configured for receiving the signal from the base unit on that same channel. Similarly, while the handset unit is transmitting on the channel, the base unit is configured for receiving the signal from the handset. Thus, the voice data is digitized and transmitted in packets between the handset unit and the base unit. This packetized handling of the voice data results in perceptible echoes or undesirable sidetone in the handset unit of the digital portable telephone.

Figure 2:
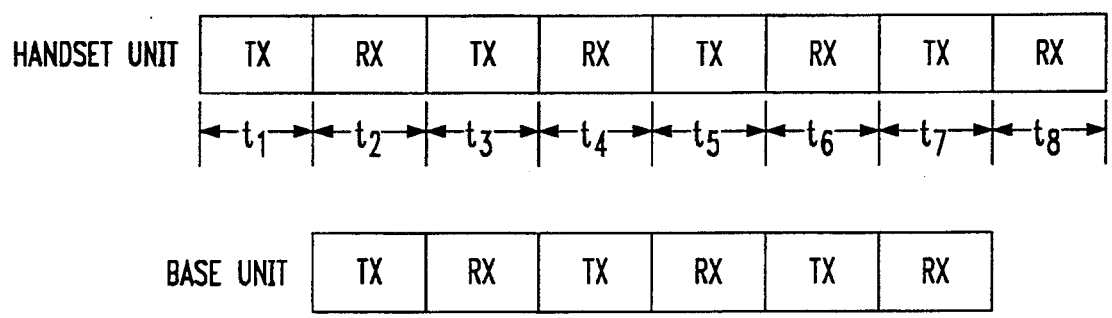
FIG. 2 illustrates the packetized handling of voice data by the handset and base units of the digital portable telephone and the processes occurring in the handset unit and base unit which results in the generation of echoes in the handset unit.

In a digital telephone the total delay includes all of the delays associated with a typical analog telephone as well as any digital delays encountered in the processing of the digital signal. Thus with reference to FIG. 1, the signal from the handset unit is received in the power amplifier (PA) 143 in the base unit 14. From this power amplifier 143, the echo path from the handset unit 10 goes through a digital delay 141 in the base unit 14, a path delay in the PBX switch, illustratively shown going through hybrids 13, 16 and 15 and returning through these hybrids when the handset unit 10 is communicating with the station 11, and a digital delay 142 in the base unit 14. Digital delays, as shown in FIG. 2 and described later herein, are present in the handset unit 10 and also are considered a part of the echo path. These delays all combine to provide a noticeable delayed echo path back to the voice receiver of the handset unit 10. In accordance with the embodiment, the echo suppressor arrangement, comprising the transmit/receive direction comparator 340 and the gain/loss circuit 370, is included in the digital portable telephone for the suppressing of echoes or undesirable sidetone generated in the base unit 14 and the PBX switch and preventing these echoes from appearing in the handset unit 10.

Sidetone echo suppression is achieved by inserting loss into the receive path of the base unit 14 such that the delayed voice signal, due to path delay from the PBX switch and any digital delays, is not reproduced, or reproduced at a greatly reduced level as desired, in the handset unit 10. To correctly insert loss into the receive path for sidetone echo suppression, the echo suppressor arrangement comprising the transmit/receive direction comparator 340 and the gain/loss circuit 370 is employed. The transmit/receive direction comparator 340 determines the direction of dominant speech signals appearing in the base unit 14 while this unit is communicating with the handset unit 10. These dominant speech signals either originate at the handset unit 10 or at a remote telephone station, such as station 11, and are received by the base unit 14 over the line connecting the hybrid 13 to the PBX switch. If the dominant signal in the base unit 14 is from the handset unit 10, the transmit/receive direction comparator 340 configures the gain/loss circuit 370 to insert a predetermined amount of loss into the receive voice path which couples signals to the handset unit 10 from the remote telephone station. This prevents the side tone echo from being produced at an objectional level in the handset voice receiver when the user of the handset unit is speaking. If the dominant signal is from the remote telephone station, however, the transmit/receive direction comparator 340 configures the gain/loss circuit 370 to remove the predetermined amount of loss from the receive voice path. This allows for normal receiver voice response at the handset unit 10. Since users of the handset unit 10 expect to receive some sidetone level, a desired level of normal sidetone is easily provided locally in this handset unit using well known methods.

The digital portable telephone uses frequencies in the Instrument, Scientific, and Medical (ISM) 900 MHz band for communications between its handset unit and its base unit. A frequency hopping protocol is employed wherein 50 radio-frequency (RF) channels are traversed in a pseudo random sequence at a 5 ms per channel rate. In the operation of the digital portable telephone, the base unit 14 and the handset unit 10 communicate with each other by alternately transmitting and receiving on the same channel. Thus, when the base unit 14 is transmitting on a channel, the handset unit 10 is configured for receiving the signal from the base unit 14. Similarly, while the handset unit 10 is transmitting on the channel, the base unit 14 is configured for receiving the signal from the handset unit 10.

By way of general information, although not germane to the invention disclosed herein, the following description on the operation of the digital portable telephone is provided. The channel spacing in the ISM 900 MHz band for operation of the digital portable telephone is 150 KHz between the frequencies of 902 MHz and 928 MHz. This permits 173 channels to be available for pseudo random selection of the 50 RF channels.

RF communication between the base and the handset requires an initial setup procedure which allows for symbol and frame synchronization. Such a procedure is set forth in U.S. patent application Ser. No. 07/779,754 filed in the name of M. E. Gillis et al. on Oct. 21, 1991.

After the setup procedure establishes a high level of confidence in the communication link, data from microprocessors (not shown) in both the base unit 14 and the handset unit 10 and also voice data between the handset 10 and the base unit 14 are exchanged.

In the operation of the, base unit 14, a clock (not shown) in the base unit and a base transmit subframe, as shown in FIG. 2 and described later herein, is fixed and used as a reference for communication between the base unit 14 and the handset unit 10. The base receive subframe, however, must be allowed to move in time because of the round trip delay to the handset 10 and back to the base unit 14. This delay is due to a latency in detecting the transmitted data at both the base unit 14 and handset unit 10 in addition to a path delay because of the distance separating the base unit and the handset unit.

In the operation of the handset unit 10, a handset unit clock (not shown) operates at the same frequency as the base unit clock in order to accurately receive the transmitted data. To achieve synchronization, the handset unit clock is operated as a voltage control oscillator (VCO) in a phase lock loop (PLL) circuit. The recovered symbol clock is compared to the internal symbol clock and the system clock is adjusted accordingly.

Once the link between the base unit 14 and the handset unit 10 is established, the handset transmit subframe is synchronized to the handset receive subframe. Thus the handset receive subframe provides a reference for the handset transmit subframe. If the handset receive subframe drifts to a new position away from the last position that synchronized the handset transmit subframe, then the handset transmit subframe is resynchronized to the new position of the handset receive subframe.

Referring next to FIG. 2, there is shown the communication frames used in transmitting and receiving data between the base unit 14 and the handset unit 10. Each communication frame comprises a transmit subframe and a receive subframe. For example, the first illustrated communication frame for the handset unit comprises both handset transmit subframe occurring over a period $t_1$ and handset receive subframe occurring over a period $t_2$. Each transmit and receive subframe is 2.5 ms in length and each communication frame is, accordingly, 5 ms in length. Without the echo suppressing arrangement described in detail later herein with reference to FIG. 3, a perceptible delayed sidetone echo of the person speaking at the handset unit 10 is returned to the audio receiver of this handset unit where it is heard by the person speaking.

In an illustrative example of the generation of the sidetone echo in the digital portable telephone, during the first handset communication frame $(t_1+t_2)$, speech in the handset unit is digitized for 5 ms and stored in a transmit buffer until transmission. Next, the speech or voice data generated in the handset unit during the first handset communication frame $(t_1+t_2)$, is transmitted to the base unit during the handset transmit subframe $t_3$. At the same time, the voice data from the handset unit is received by the base unit and stored in a receive buffer during the subframe $t_3$ which is a receive subframe for the base unit. Next, during the communication subframes $(t_4+t_5)$, the received voice data is decoded to an analog voice signal by the base unit and coupled to the hybrid 13, shown in FIG. 1. At the same time during these communication subframes $(t_4+t_5)$, the analog signal, from the PBX switch and appearing at the hybrid 13, is digitized in the base unit and put in a transmit buffer for transmission to the handset unit. Since the analog signal injected into the hybrid 13 by the base unit over the 5 ms of the subframes $(t_4+t_5)$ will return to the hybrid 13 within several microseconds, along with incoming speech from the PBX switch, the decoded received voice data from the handset unit is essentially again digitized in the base unit, along with the analog signal from the PBX switch, as a composite voice data signal for transmission to the handset unit in the base unit transmit subframe occurring at $t_6$. The handset receive subframe also occurring at $t_6$ receives this composite voice data and stores this data in a handset receive buffer. At handset subframes $(t_7+t_8)$, the composite voice data from the base unit is decoded to an analog signal and coupled to the audio receiver of the handset unit. Thus, the speech information generated in the handset unit by a user at communication subframes $t_1+t_2$ appears again in the handset unit at communication subframes $t_7+t_8$. As a result, there is a three communication frame delay, or 15 ms delay, from the time the voice signal is originated in the handset unit to the time the feedback voice signal arrives at the audio receiver at the handset unit. To the user, this delay is perceived as an echo of the user's voice instead of the traditional desirable sidetone.

Figure 3:
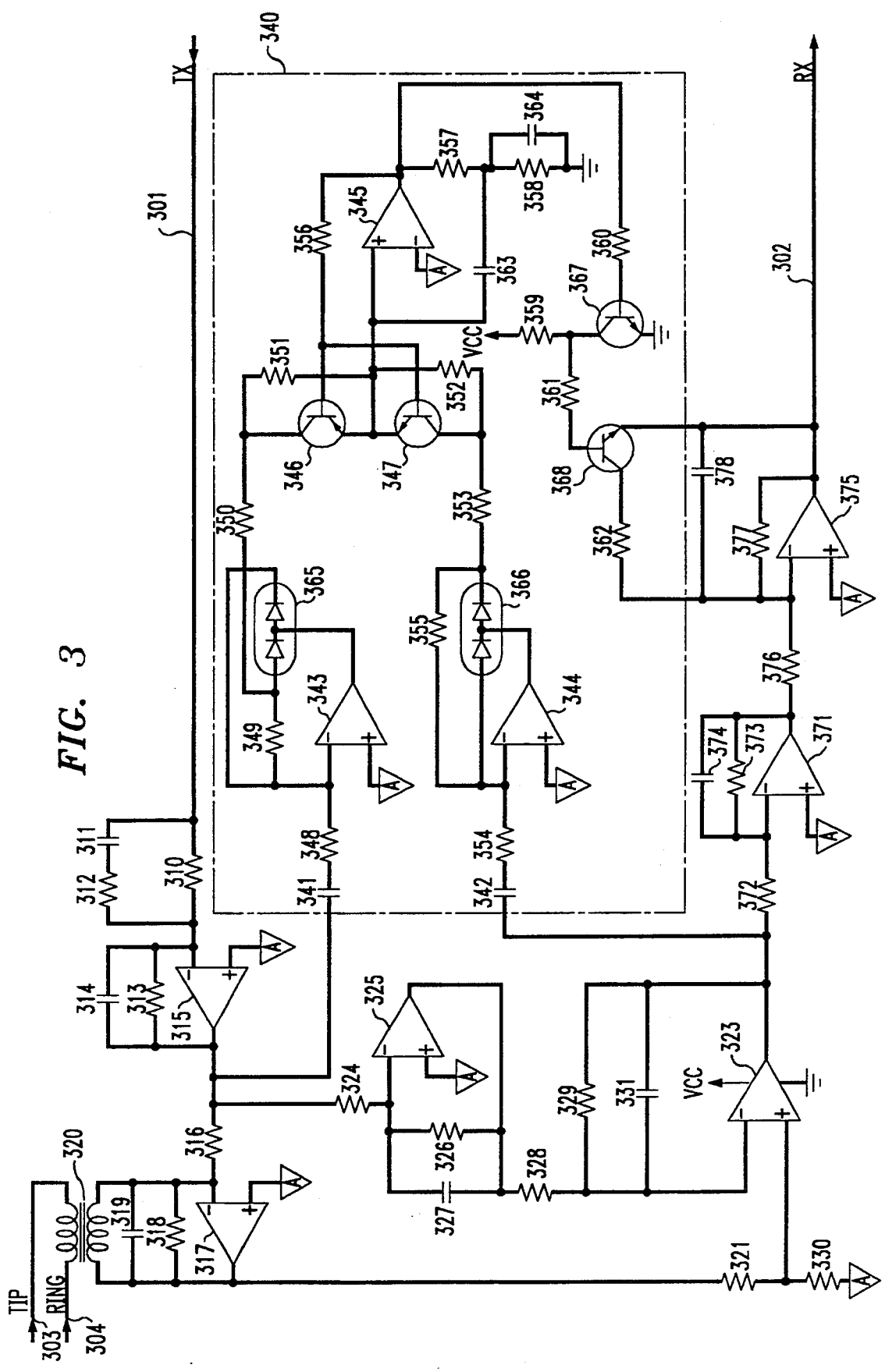
FIG. 3 is a detail schematic of the circuitry shown in FIG. 1 for suppressing echoes generated in the digital portable telephone.

Referring next to FIG. 3, there is shown the details of the echo suppression circuitry arrangement of FIG. 1. The voice transmit signal received from the handset 10 and decoded by the base unit 14 is coupled over line 301 into a passive network, comprising a resistor 310 connected in parallel with a series network comprising capacitor 311 and resistor 312, which provides pre-emphasis for this transmit signal. This passive network provides the input resistance to a gain stage comprising operational amplifier 315 and an associated resistor 313 and capacitor 314 located in the feedback path of the operational amplifier 315. The combination of resistor 313 and capacitor 314 provides gain as well as high frequency roll-off for the voice transmit signal. The non-inverting input of the operational amplifier 315 is connected to an analog reference voltage "A" which has a typical potential of VCC/2.

The output of the operational amplifier 315 serves as an input for three different feed points. A first feed point is into a hybrid driver stage which comprises operational amplifier 317, resistors 316 and 318, capacitor 319 and transformer 320. This hybrid driver stage provides four-wire to two-wire conversion for coupling the voice transmit signal provided by the handset 10 onto the tip-ring lines 303,304 and for receiving the voice receive signal from the tip-ring lines 303,304 and coupling this receive signal to the handset 10.

A second feed point of the operational amplifier 315 is into a unity gain stage consisting of operational amplifier 325 and associated resistors 324 and 326 and capacitor 327. The combination of resistors 324, 326 and capacitor 327 provides unity gain as well as frequency roll-off for the operational amplifier 325. Also, this stage provides inversion of the transmit signal before it is coupled to the input resistor 328 of operational amplifier 323. The ratio of resistor 329 to resistor 328 provides unity gain of the inverted transmit signal; while resistors 328, 329, 330, and 321 provide unity gain of the receive signal for this operational amplifier 323. Capacitor 331 provides high frequency roll-off for this difference amplifier stage 323.

A third feed point of the operational amplifier 315 provides a signal input for the transmit signal into the direction comparator circuit 340 via a capacitor 341. The output of operational amplifier 323 similarly provides the receive signal into the direction comparator circuit 340 via a capacitor 342. The output of operational amplifier 323 also provides the receive signal into a first and a second gain receive stage of the gain/loss circuit 370. The first gain receive stage comprises operational amplifier 371 and associated resistors 372 and 373 and a capacitor 374. Resistor 372 along with resistor 373 and capacitor 374 provide gain as well as high frequency roll-off for operational amplifier 371. The second gain receive stage comprises operational amplifier 375 and associated resistors 376, 377 and capacitor 378, in the direction comparator circuit 340, resistor 362, and transistor 368. Resistors 376 and 377 along with capacitor 378 have a value such that the operational amplifier 375 provides gain for the receive signal that is coded in the base unit 14 and sent to the handset 10.

The output of the operational amplifier 325 is coupled into the inverting input of operational amplifier 323 via resistor 328 and the output of operational amplifier 317 is coupled into the noninverting input of this amplifier 323 via resistor 321. Coupling the signals from both operational amplifiers 317 and 325 into the difference operational amplifier 323 reduces the effect of the transmit signal on the receive input of the comparator circuit 340 at the receive half-wave rectifier 344. Given the architecture of the hybrid, the transmit signal essentially becomes the receive signal. Without the inverted transmit voice signal from operational amplifier 325 being fed into the difference amplifier, the comparator circuit 340 would not operate properly inasmuch as the transmit voice signal from operational amplifier 315 and the receive transmit voice signal from operational amplifier 323 would appear at the input to the comparator circuit 340 with the same amplitude-negating the transmit switching operation of the comparator circuit 340. When in receive, therefore, operational amplifier 325 does not affect the operation of operational amplifier 323 and the receive signal is passed on to both the comparator circuit input to receive half-wave rectifier 344 via capacitor 342 and resistor 354, and also to the final receive gain stages respectively comprising operational amplifiers 371 and 375 and the associated components for these amplifiers.

In order to determine the direction of dominant voice transmission, the direction comparator circuit 340 monitors both the peak energy contained in the transmit signal and the peak energy contained in the receive signal. To facilitate this process, both the transmit and receive voice signals are passed through half-wave rectifiers. The transmit signal is passed through the transmit half-wave rectifier 343 and the receive signal is passed through the receive half-wave rectifier 344. The dual diode 365 in the feedback path of the transmit half-wave rectifier 343 clamps the NEGATIVE portion of the transmit voice signal input while amplifying the POSITIVE portion via the ratio of the input resistor 348 and the feedback resistor 349. A nominal input level at the microphone of the handset 10 will produce a transmit switching voltage level at the non-inverting input of the comparator 345.

The dual diode 366 in the feedback path of the receive half-wave rectifier 344 clamps the POSITIVE portion of a nominal receive voice signal input while amplifying the NEGATIVE portion via the ratio of the input resistor 354 and the feedback resistor 355. This produces a receive switching level at the non-inverting input of the comparator 345.

DC blocking capacitors 341 and 342 reduce DC offset voltages which appear at the output of the half-wave rectifiers 343 and 344. The output of the half-wave rectifiers 343 and 344 feed opposite ends of a resistive voltage divider consisting of resistors 350 through 353. The non-inverting input of comparator 345 center-taps the resistive voltage divider to monitor the voltage level output of the two half-wave rectifiers 343 and 344. The inverted input to the comparator 345 sets the switching reference voltage for this comparator at VCC/2.

When a transmit signal of sufficient magnitude causes the non-inverting input of the comparator 345 to become more NEGATIVE with respect to VCC/2, the output of the comparator 345 goes LOW (transmit voice signal detected) which configures the direction comparison circuit 340 into the transmit mode. At this point, loss is switched into the receive voice path, as described in detail later herein. When the output of the comparator 345 is LOW, it provides bias for the PNP transistor 346 via the feedback resistor 356 turning the transistor 346 ON and shunting the resistor 351. By shunting this resistor 351, the receive signal will have to be much stronger than the transmit voice signal to switch the direction comparator circuit 340 into a receive signal state. When the PNP transistor 346 is ON, the NPN transistor 347 is reversed-biased or OFF. Similarly, when the NPN transistor 347 is ON, the PNP transistor 347 is reversed biased or OFF.

When a receive signal of sufficient magnitude causes the non-inverting input of the comparator 345 to become more POSITIVE with respect to VCC/2, the output of the comparator 345 goes HIGH (receive voice signal detected). This configures the circuit 340 in its receive mode, and the loss is switched OUT of the receive path, as further described later herein. A HIGH output at comparator 345 provides bias for the NPN transistor 347 via the feedback resistor 356. This bias voltage turns the transistor 347 ON and shunts the resistor 352. By shunting the resistor 352, the circuit 340 requires a stronger transmit signal to switch the circuit out of the receive mode.

The operation of the transmit/receive direction comparator circuit 340 is such that when it switches to either mode (transmit or receive), it remains in that state until a voice signal of sufficient magnitude causes this circuit to switch to the opposite mode. When the circuit is idle in its switched-to mode, the feedback resistor 356 provides hysteresis for both transmit and receive. The hysteresis for transmit and receive can be increased/decreased by decreasing/increasing the resistance of this feedback resistor 356.

The resistor 357 and the capacitor 363 in the feedback path of the comparator 345 cause the comparator to rail to it's maximum or minimum before settling the circuit 340 in either the transmit or receive mode. Although decreasing the capacitance of the capacitor 363 allows for faster switching times, a limit on the minimum capacitance of the capacitor must be observed since if this capacitor 363 is allowed to be too small, instability or oscillations may occur. The resistor 358 and capacitor 364 provide holdover time for the circuit 340, so that the comparator 345 has time to lock into either transmit or receive mode. This also prevents oscillations or abbreviated switching of the output of comparator 345 allowing the circuit 340 to settle into the transmit or receive mode.

The output of the comparator 345 provides bias for the base of the NPN transistor 367 via resistor 360. This transistor 367 is used as an inverter for the output signals of comparator 345. When the output of comparator 345 is LOW (transmit signal detected), the base-emitter junction of the inverting transistor 367 is reverse biased and the NPN feedback transistor 368 is turned ON by forward biasing it's base-emitter junction through the resistor 361 and the collector resistor 359 to VCC. Forward biasing the feedback transistor 368 provides a parallel feedback path for resistor 362 with the feedback resistor 377 and high frequency roll-off capacitor 378. This parallel combination reduces the feedback resistance of operational amplifier 375 and subsequently—the receive (sidetone) gain level is reduced. A HIGH at the output of the comparator 345 (receive signal detected) forward biases the base-emitter junction of the inverting transistor 367 and this transistor turns ON. Transistor 367, in its ON state, reverse biases the base-emitter junction of the feedback transistor 368 by pulling the base resistor 361 to ground through the ON transistor 367. Reverse biasing the feedback transistor 368 essentially opens the parallel feedback path to resistor 362 in the receive stage and allows for normal receiver voice response. It is the action of switching this NPN feedback transistor 368 ON during transmit and OFF during receive that decreases the sidetone (for echo suppression) while allowing for normal receiver operation when the feedback NPN transistor 368 is OFF.

What has been described is merely illustrative of the present invention. Various other modifications of this invention are contemplated and may obviously be resorted to by those skilled in the art without departing from the spirit and scope of the invention as hereinafter defined by the appended claims.

I claim:

1. An arrangement for suppressing echoes in a digital portable telephone including a base unit and a handset unit, the base unit and the handset unit communicating over a plurality of wireless communication channels and the base unit being connectable to a telephone line for receiving signals from this line and coupling signals onto this line, the arrangement comprising:

communication means in the base unit and the handset unit for communicating in a frequency hopping system, said base unit and said handset unit alternately transmitting and receiving signals on each of the plurality of wireless communication channels in said frequency hopping system;

means for coupling signals present in a signal receive path in the base unit to the handset unit over the plurality of wireless communication channels;

means for detecting the direction of dominant speech signals appearing in the signal receive path in the base unit, the dominant speech signals either originating at the handset unit or at a remote telephone station and received by the base unit from the telephone line; and means responsive to the detecting means for inserting loss into the signal receive path in the base unit when the dominant speech signals appearing in the base unit originate at the handset unit, said loss inserting means preventing said dominant speech signals originating at the handset unit from being transmitted over said wireless communication channels to the handset unit.

2. The arrangement for suppressing echoes as in claim 1 wherein the detecting means configures the loss inserting means to remove the inserted loss from the signal receive path in the base unit when the dominant speech signals appearing in the base unit originate at the remote telephone station.

3. The arrangement for suppressing echoes as in claim 2 wherein the detecting means comprises a transmit and receive direction comparator.

4. The arrangement for suppressing echoes as in claim 3 wherein the direction comparator includes means for monitoring signals appearing in both a signal transmit path and the signal receive path, the signals in the signal transmit path being those signals originating at the handset unit and being coupled from the base unit to the telephone line.

5. The arrangement for suppressing echoes as in claim 2 wherein the loss inserting means comprises a gain/loss circuit.

6. The arrangement for suppressing echoes as in claim 5 wherein the gain/loss circuit includes a first and a second operational amplifier serially connected in the signal receive path.

7. The arrangement for suppressing echoes as in claim 6 wherein a gain of the second operational amplifier is reduced by the detecting means to a predetermined level for preventing the speech signals on the signal receive path from being coupled over the plurality of wireless communication channels to the handset unit when the dominant speech signals appearing in the base unit originate in the handset unit.

8. The arrangement for suppressing echoes as in claim 7 wherein the second operational amplifier includes resistor switching means.

9. The arrangement for suppressing echoes as in claim 8 wherein the resistor switching means includes switchable resistance levels for providing a first and second gain level of said second operational amplifier, a first level of resistance providing gain for speech signals at a first gain level by the second operation amplifier, these speech signals being coupled to the handset unit, a second level of resistance providing gain for speech signals at a second level by the second operational amplifier, the second gain level being said predetermined level for preventing speech levels on the signal receive path from being coupled to the handset unit.

10. The arrangement for suppressing echoes as in claim 2 wherein the speech signals transmitted between the handset unit and the base unit are digitized and transmitted in data packets.

11. A method of suppressing echoes in a digital portable telephone including a base unit and a handset unit, the base unit and the handset unit communicating over a plurality of wireless communication channels and the base unit being connectable to a telephone line for receiving signals from this line and coupling signals onto this line, the method comprising the steps of:

communicating by the base unit and the handset unit in a frequency hopping system, said base unit and said handset unit alternately transmitting and receiving signals on each of the plurality of wireless communication channels in said frequency hopping system;

coupling signals present in a signal receive path in the base unit to the handset unit over the plurality of wireless communication channels;

detecting the direction of dominant speech signals appearing in the signal receive path in the base unit, the dominant speech signals either originating at the handset unit or at a remote telephone station and being received by the base unit from the telephone line: and inserting loss into the signal receive path in the base unit when the dominant speech signals appearing in the base unit originate at the handset unit, said loss inserting step preventing said dominant speech signals originating at the handset unit from being transmitted over said wireless communication channels to the handset unit.

12. The method of suppressing echoes as in claim 11 wherein the detecting step further includes the step of configuring the loss inserting step to remove the inserted loss from the signal receive path in the base unit when the dominant speech signals appearing in the base unit originate at the remote telephone station.

13. The method of suppressing echoes as in claim 12 wherein the digital portable telephone includes a transmit and receive direction comparator.

14. The method of suppressing echoes as in claim 12 further including the step of monitoring in the direction comparator signals appearing in both a signal transmit path and the signal receive path, the signals in the signal transmit path being those signals originating at the handset unit and being coupled from the base unit to the telephone line.

15. The method of suppressing echoes as in claim 14 wherein the digital portable telephone includes a first and a second operational amplifier serially connected in the signal receive path.

16. The method of suppressing echoes as in claim 15 including the step of reducing the gain of the second operational amplifier to a predetermined level for preventing the speech signals on the signal receive path from being coupled over the plurality of wireless communication channels to the handset unit when the dominant speech signals appearing in the base unit originate in the handset unit.

17. The method of suppressing echoes as in claim 16 wherein the reducing step further includes the step of switching resistance levels in the second operational amplifier for providing a first and second gain level of said second operational amplifier, a first level of resistance providing gain at a first gain level for speech signals entering the second operation amplifier, these speech signals being coupled to the handset unit, a second level of resistance providing gain at a second gain level for speech signals entering the second operational amplifier, the second gain level being said predetermined level for preventing speech levels on the signal receive path from being coupled to the handset unit.

18. The method of suppressing echoes as in claim 16 wherein the reducing step further includes the step of switching resistance levels in the second operational amplifier for providing a first and second gain level of said second operational amplifier, a first level of resistance providing gain at a first gain level for speech signals entering the second operation amplifier, these speech signals being coupled to the handset unit, a second level of resistance providing gain at a second gain level for speech signals entering the second operational amplifier, the second gain level being said predetermined level for coupling speech levels on the signal receive path to the handset unit at a reduced level.

19. An arrangement for suppressing echoes in a digital portable telephone including a base unit and a handset unit, the base unit and the handset unit communicating over a plurality of wireless communication channels and the base unit being connectable to a telephone line for receiving signals from this line and coupling signals onto this line, the arrangement comprising:

communication means in the base unit and the handset unit for communicating in a frequency hopping system, said base unit and said handset unit alternately transmitting and receiving signals on each of the plurality of wireless communication channels in said frequency hopping system;

means for coupling signals present in a signal receive path in the base unit to the handset unit over the plurality of wireless communication channels;

means for detecting the origin of dominant speech signals appearing in the signal receive path in the base unit, the dominant speech signals either originating at the handset unit or at a remote telephone station and received by the base unit from the telephone line; and means responsive to the detecting means for inserting loss into the signal receive path in the base unit when the dominant speech signals appearing in the base unit originate at the handset unit, said loss inserting means preventing said dominant speech signals originating at the handset unit from being transmitted over said wireless communication channels to the handset unit.

20. The arrangement for suppressing echoes as in claim 10 further including communications frames for transmitting and receiving the data packets of the digitized speech signals.

21. The arrangement for suppressing echoes as in claim 20 wherein each communication frame includes a transmit subframe and a receive subframe in which the digitized speech signals are alternately transmitted and received by the base unit and the handset unit while on each one of the plurality of wireless communication channels.

22. The method of suppressing echoes as in claim 18 further including the step of transmitting the speech signals between the handset unit and the base unit in digitized data packets and the step of providing communications frames for transmitting and receiving said data packets.

23. The method of suppressing echoes as in claim 22 wherein each communication frame includes a transmit subframe and a receive subframe in which the data packets are alternately transmitted and received by the base unit and the handset unit while on each one of the plurality of wireless communication channels.

* * * * *